United States Patent [19]

Argyll

[11] 4,046,689
[45] Sept. 6, 1977

[54] METHOD AND APPARATUS FOR TRANSPORTING SLUDGE WHILE RENDERING IT FOR CONVERSION INTO FERTILIZER

[76] Inventor: Marion H. Argyll, 15 E. Irving St., Chevy Chase, Md. 20015

[21] Appl. No.: 703,948

[22] Filed: July 9, 1976

[51] Int. Cl.² .......................................... C22B 11/10
[52] U.S. Cl. .................................. 210/59; 210/63 R; 210/67; 210/68; 210/71; 210/83; 210/241
[58] Field of Search ...................... 210/67, 68, 71, 72, 210/241, 63, 83, 59; 159/DIG. 10, DIG. 11, 38–41, 47 WL; 203/DIG. 5

[56] References Cited

U.S. PATENT DOCUMENTS

| 950,977 | 3/1910 | Welcome | 210/241 |
|---|---|---|---|
| 2,972,411 | 2/1961 | O'Dette | 210/241 |
| 3,319,789 | 5/1967 | Brown et al. | 210/67 |
| 3,345,152 | 10/1967 | Appleman | 203/DIG. 5 |
| 3,504,797 | 4/1970 | Reid | 210/152 |
| 3,622,511 | 11/1971 | Pizzo et al. | 203/DIG. 5 |
| 3,700,565 | 10/1972 | Cornish et al. | 203/DIG. 5 |
| 3,868,731 | 3/1975 | Stahl et al. | 203/DIG. 5 |
| 3,956,126 | 5/1976 | Streebin et al. | 210/71 |
| 3,972,811 | 8/1976 | Larkins et al. | 210/71 |
| Re. 27,346 | 4/1972 | Naylor | 210/241 |

FOREIGN PATENT DOCUMENTS

| 943,057 | 3/1974 | Canada | 210/241 |
|---|---|---|---|
| 2,234,354 | 1/1974 | Germany | 210/241 |

*Primary Examiner*—Frank W. Lutter
*Assistant Examiner*—Frank Sever

[57] ABSTRACT

The present disclosure is directed to a method and apparatus for rendering sludge and effluent into state usable for conversion into fertilizer while transporting the sludge and effluent from the sewage system to a fertilizer processing plant. The apparatus is a truck body having a transport bed upon which is mounted a drum into which the mixture of sludge and effluent is pumped or dumped. The effluent is separated from the sludge through a system of channels into an effluent tank which process is promoted by heat from burners under the drum and effluent tank. The sludge is dried, aerated and raked from the transport bed for further processing in a dry granular material which will form the base for a fertilizer. The effluent drained from the effluent tank in liquid form makes the base for a urea fertilizer.

5 Claims, 5 Drawing Figures

METHOD AND APPARATUS FOR TRANSPORTING SLUDGE WHILE RENDERING IT FOR CONVERSION INTO FERTILIZER

An object of the present invention is the provision of a sludge and effluent mixture removal from a sewage system to avoid dumping of the sewage into rivers, streams and lakes. The procedure for the sludge is not to burn it, not to treat it but to boil it for a desired period of time to remove the undesirable elements. It is then aerated and dried.

A still further object of the invention is the provision of a process that is accomplished en route after the truck has been loaded from the end of the sewage system. The truck is then driven back to its home-base and the waste and fluid is turned over the plant for mixing and producing fertilizer. Using this process for sterilizing and drying of the sludge will save the fertilizer plant over two weeks of drying time in the sun and will enable production of fertilizer in tremendous quantities per day, per truck.

Another object of the present invention is to provide a special truck for carrying out the process while en route from the sewage plant or system to a fertilizer plant.

With the foregoing and other objects in view the invention will be more fully described hereinafter and more particularly pointed out in the appended claims.

In the drawings in which the parts are denoted by reference characters throughout the several views.

Figure 5:
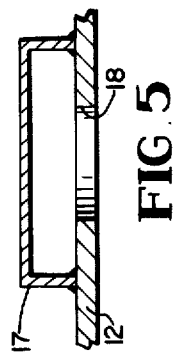
FIG. 5 is a horizontal section taken on the lines 5—5 in FIG. 3 showing the channel relationship to the openings through the walls of the drums.
Figure 3:
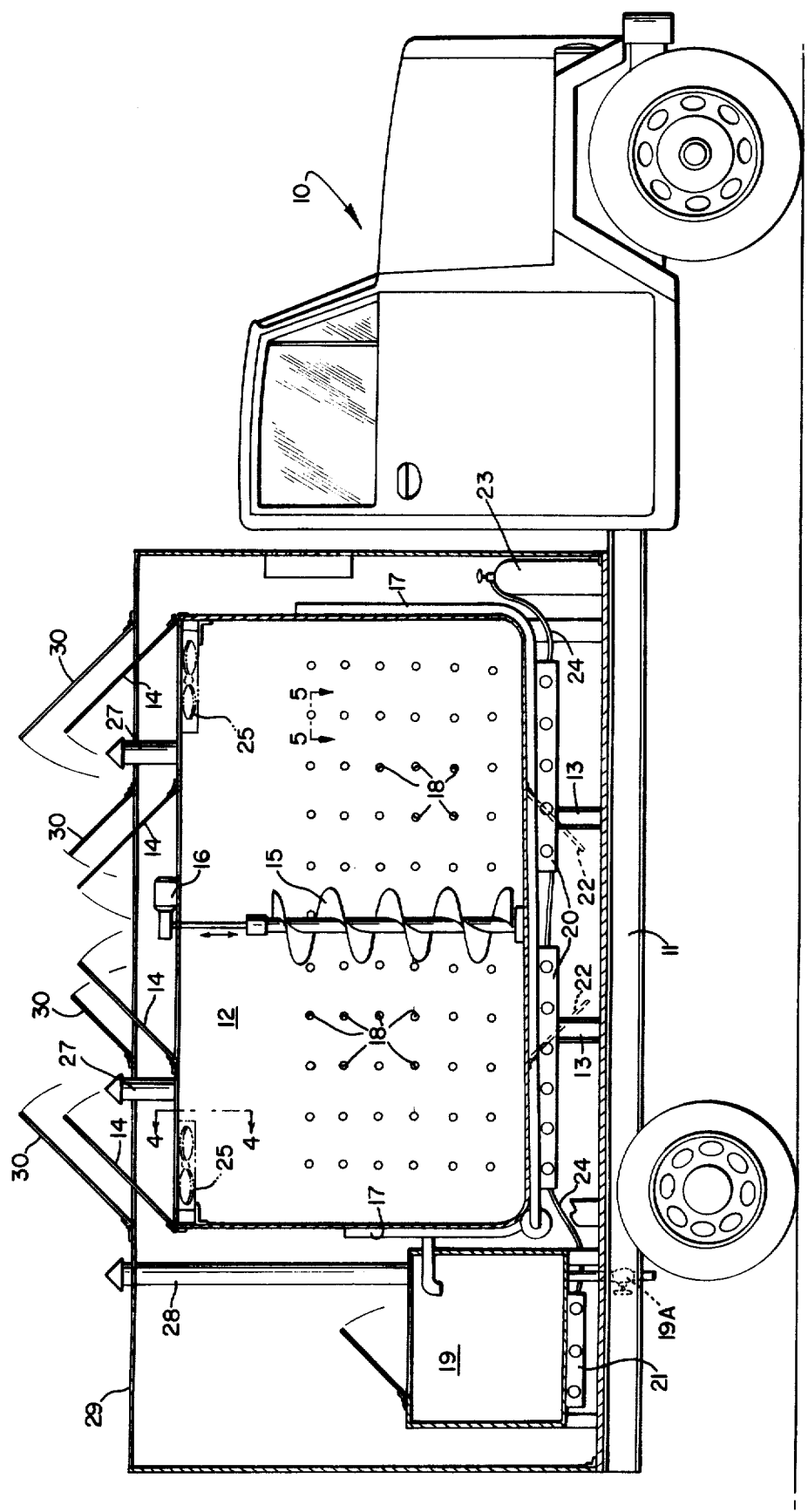
FIG. 3 is a side elevational view of the truck with a vertical section along the major axis of the flat bed taken on the line 3—3 in FIG. 2.

Referring now to the drawings, 10 designates a truck having a flat bed 11. A steel drum 12 is mounted above the bed 11 by support structure 13. At the top of the drum 12 are horizontally pivoted doors 14 that give access for loading sludge and effluent into the drum. An archimedean screw 15 is mounted in the drum for both vertical and rotary movement by a motor 16 so that upon rotation it agitates the contents of the drum. Located externally of the drum is a system of channels 17, a cross-section of one of which is best seen in FIG. 5, which communicate with the interior of the drum through openings 18. The purpose of the openings, best seen in FIGS. 3 and 5, is to provide a means for conducting effluent from the drum 12 to an effluent tank 19 (for urea fertilizer) and also for drying the sludge. A drain valve 19A is provided for external draining of effluent.

Mounted beneath the drum 12 are burners 20 which provide heat to dry the sludge and burners 21 are mounted beneath the effluent tank 19. Doors 22 are located on the underside of the drum 12 to allow discharge of the dried granular sludge to permit it being raked outside of the flat bed. The burners 20,21 may receive their fuel from bottled gas 23 or other suitable fuel conduction to the burners through lines 24.

Figure 1:
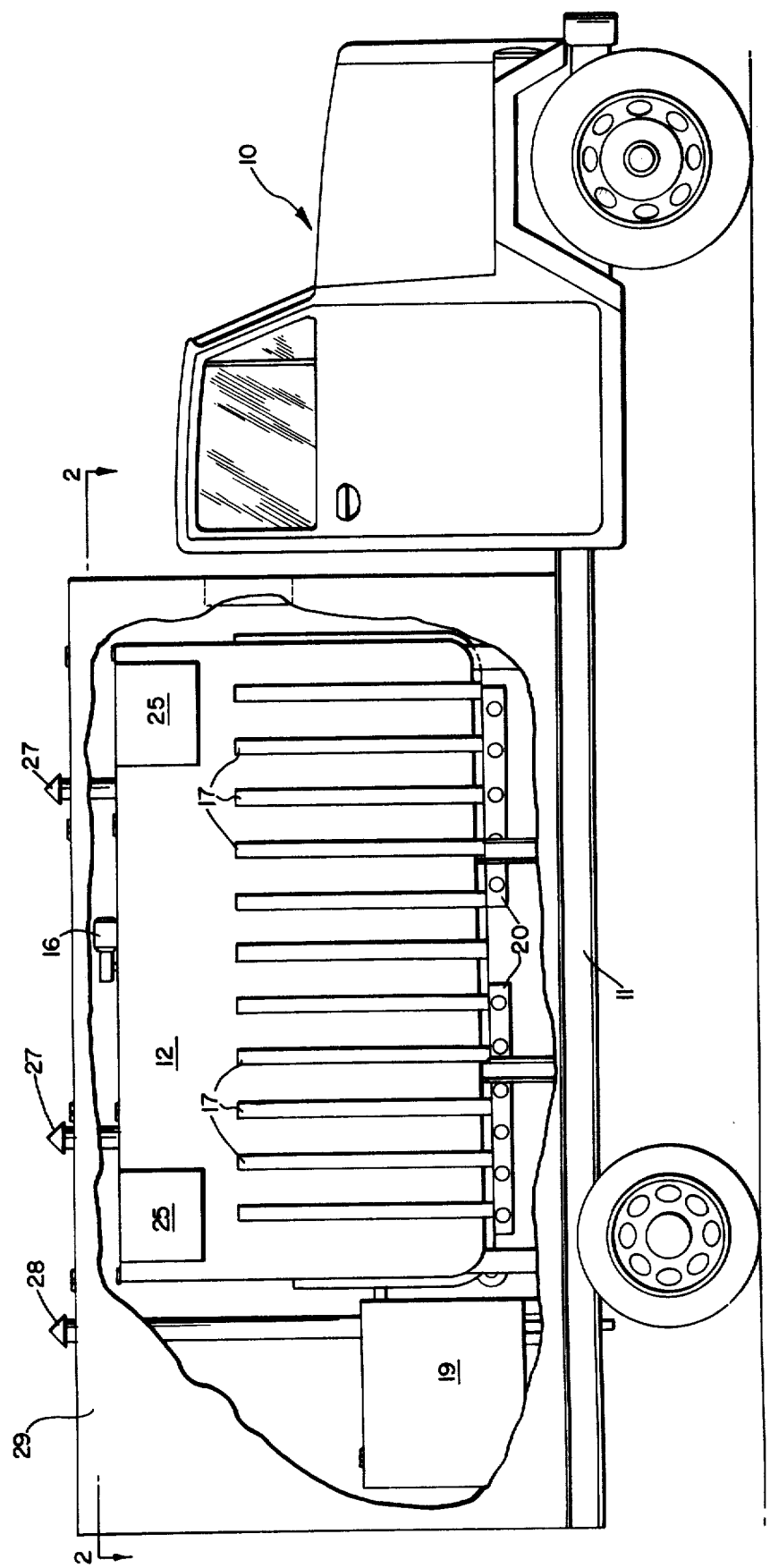
FIG. 1 is a side elevation view of a truck modified in accordance with the present invention, having parts broken away.
Figure 4:
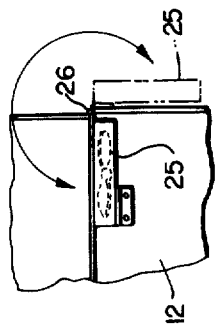
FIG. 4 is a magnified section taken on the lines 4—4 in FIG. 3 with the fans shown in solid lines in aeration position and in dash lines during transport.
Figure 2:
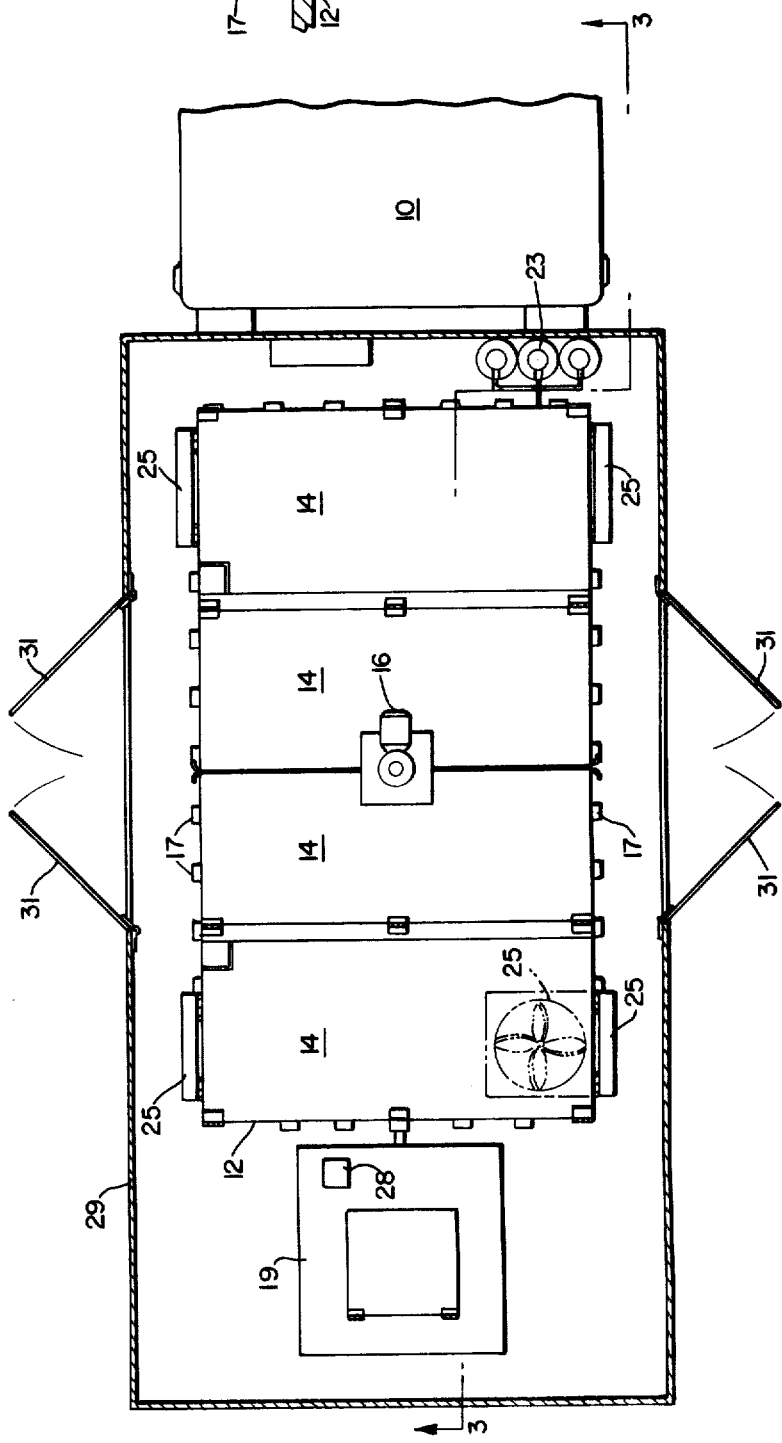
FIG. 2 is a horizontal section taken on the lines 2—2 in FIG. 1.

At the top of the drum 12, as best seen in FIG. 2 and 4, are four electric fans 25 pivotally attached to the outside of the drum 12 at 26. When in use with the doors 14 open they are turned into the tank for the duration of the aeration cycle. The drum 12 and effluent tank 19 are both vented as shown at 27, 28.

Mounted externally of the drum 12 and effluent tank 19 is a body enclosure 29 having top doors 30 in substantial vertical registry with doors 14 on top of the drum 12 to permit introduction of the sludge into the drum while side doors 31 pivoted on each side of the external body permit removal of the dried sludge.

IN OPERATION

The secondary sludge and effluent is introduced into the drum 12 by opening the doors 30 and doors 14. When the drum is charged, the doors are closed and the burners 20 and 21 are lit off and as the sludge is subjected to the extreme heat of the burners, the screw 15 is rotated to remove all effluent from the drum. As the heat increases the sludge dries out with a suitable residue left establishing a base for fertilizer. The screw 15 continues to rotate while the fans 25 aerate the remains of the residue. When cool the screw 15 is lifted, the side doors 31 opened and the residue is raked into containers for processing into fertilizer. At no time is the sludge incinerated. The effluent is drained from the effluent tank 19 by opening drain valve 19A and discharging the effluent into a collecting tank for further processing into a fertilizer also.

The truck of the present invention may have a flat bed 11 of sufficient length to carry two or more units to allow large quantities to be transported from place to place.

As the truck is in motion the above mentioned process is taking place and when the driver arrives at his destination the process should be completed. If the distance is short the truck, under supervision, may be allowed to continue in operation overnight or until cycle has been completed.

Each truck makes three trips per day, after the drying, the aeration and purification has been completed for each trip.

Each load is taken to the plant of the manufacturer for processing into fertilizer. Here the sludge and effluents are treated with nitrogen, potash, phosphate and other nutrients according to the requirements of the soil. It is then sold as fertilizer.

Using the proposed plan a community can be rid of its waste material avoiding the disposal of sewage systems into rivers and lakes.

The procedure for the sludge is not to burn it, not to treat it, but to boil it for a desired period of time to remove the undesirable elements. It is then aerated and dried.

This process is accomplished en route after the truck has been loaded from the end of the sewage system. The truck is then driven back to its home-base and the waste and fluid is turned over to the plant for producing fertilizer. Using this process the sterilizing and drying of the sludge will save the fertilizer plant over two weeks of drying time in the sun and will enable production of fertilizer in tremendous quantities per day, per truck.

This project is for national usage and large numbers of these especially designed trucks will be used throughout the cities and states.

This obviates the necessity of allocating land for the necessary disposal of waste and will thereby enable the rivers and lakes to be purified.

What I claim is :

1. An apparatus for transporting secondary sludge and effluent while rendering it usable for conversion into fertilizer, comprising the following elements:
   a. a truck body having a transport bed,
   b. a drum mounted on and spaced above said transport bed,
   c. channels secured about the outside of the drum and communicating with the interior of the drum through openings through the wall of the drum,
   d. burners carried by the drum support being spaced along and beneath said drum,
   e. an archimedean screw plunger mounted in said drum for rotary and vertical movement relative thereto,
   f. an effluent tank secured to said transport bed and spaced above same,
   g. burners carried beneath said effluent tank and being connected to a heat source,
   h. means connecting said effluent tank to said channels to receive effluent therefrom,
   i. a plurality of pivotally mounted doors along the top of said drum,
   j. fan means pivotally mounted to the outside of the drum for direction into the drum when the doors are open,
   k. discharge doors in the bottom of said drum for discharging dried sludge, and
   l. discharge means for said effluent tank; said elements cooperatively functioning the produce a dry granular material from said sludge and effluent, which forms the base for a fertilizer product and a liquid which forms the base for a urea fertilizer product.

2. An apparatus as claimed in claim 1 further comprising a closed body structure carried on said transport bed enclosing said drum and effluent tank and having pivotally mounted top doors in substantially vertical alignment with the doors along the top of said drum, and pivotally mounted side doors for the discharge of the dried sludge residue exteriorly of the transport bed.

3. An appartus as claimed in claim 2 further comprising gas storage means connected to supply gas to said drum burners and said effluent tank burner.

4. The method of transporting secondary sludge and effluent from a sewage system to a fertilizer plant comprising filling a drum with a mixture of sludge and effluent, heating the mixture to boiling during transport so as to separate the effluent into a separate effluent container and to dry and concentrate the sludge, aerating the sludge within the drum, and upon arriving at destination removing concentrated effluent in liquid state from the liquid effluent container and raking and dried sludge from the drum; said dried sludge providing a base for a fertilizer product and said concentrated effluent providing a base for a urea fertilizer product.

5. The method of claim 4 further comprising the step of agitating the mixture of effluent and sludge during the heating and transport state.

* * * * *